United States Patent
McCabe et al.

(10) Patent No.: US 8,443,943 B2
(45) Date of Patent: May 21, 2013

(54) CONTROLLING OPERATION OF AN INDUSTRIAL VEHICLE BASED ON BATTERY WEIGHT

(75) Inventors: Paul P. McCabe, Binghamton, NY (US); Stephen Page, Greene, NY (US); Augustus Baldini, Binghamton, NY (US); John Bryant Kirk, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 379 days.

(21) Appl. No.: 12/765,466

(22) Filed: Apr. 22, 2010

(65) Prior Publication Data

US 2011/0264316 A1    Oct. 27, 2011

(51) Int. Cl.
*B66F 9/20*    (2006.01)
*B66F 17/00*    (2006.01)

(52) U.S. Cl.
CPC .................................. *B66F 17/003* (2013.01)
USPC ......... 187/223; 187/224; 340/572.1; 320/132

(58) Field of Classification Search
CPC .................................................. B66F 17/003
USPC ........... 701/22; 320/132; 187/223; 324/444
See application file for complete search history.

(56) References Cited

U.S. PATENT DOCUMENTS

| | | | |
|---|---|---|---|
| 5,664,635 A | | 9/1997 | Koga et al. |
| 5,791,440 A | * | 8/1998 | Lonzinski et al. ............. 187/223 |
| 5,955,869 A | * | 9/1999 | Rathmann ..................... 320/132 |
| 7,471,066 B2 | | 12/2008 | Ambrosio et al. |
| 2004/0004481 A1 | * | 1/2004 | Jin ................. 324/444 |
| 2008/0135341 A1 | * | 6/2008 | Pollard ......................... 187/237 |
| 2010/0052908 A1 | * | 3/2010 | Doan et al. ................ 340/572.1 |
| 2010/0112843 A1 | * | 5/2010 | Heichal et al. ............... 439/299 |

FOREIGN PATENT DOCUMENTS

| | | | |
|---|---|---|---|
| JP | 8163709 A | * | 6/1996 |
| JP | 2004342377 A2 | | 12/2004 |
| JP | 2007251817 A | * | 9/2007 |

* cited by examiner

*Primary Examiner* — Ryan Zeender
*Assistant Examiner* — Hunter Wilder
(74) *Attorney, Agent, or Firm* — Quarles & Brady LLP; George E. Haas (57) ABSTRACT

Operation of an industrial vehicle, such as one that lifts and transports loads, is controlled based on the weight of a removable battery. A control method involves reading a battery weight value from an electronic memory attached to a battery. That battery weight value is compared to a specified battery weight value for the industrial vehicle. The operation of the industrial vehicle is restricted to less than the normal operating characteristics when the battery weight value is less than the specified battery weight value. For example, the height to which a load can be raised is limited or the speed at which the industrial vehicle is limited when a battery installed on the industrial vehicle weighs less than the specified battery weight for effectively counterbalancing a load.

15 Claims, 4 Drawing Sheets

FIG. 10

CONTROLLING OPERATION OF AN INDUSTRIAL VEHICLE BASED ON BATTERY WEIGHT

CROSS-REFERENCE TO RELATED APPLICATION

Not applicable.

STATEMENT CONCERNING FEDERALLY SPONSORED RESEARCH OR DEVELOPMENT

Not applicable.

BACKGROUND OF THE INVENTION

1. Field of the Invention

The present invention relates to battery powered industrial vehicles, such as lift trucks; and more particularly to monitoring the performance of the battery.

2. Description of the Related Art

Electric lift trucks employ large lead-acid batteries to power their traction and lift drives. Many lift trucks are operated almost continuously throughout three work shifts a day. When the battery becomes discharged, it is replaced and the truck is immediately put back into service. The battery that was removed is then recharged off the truck and prepared for use on another truck. In a warehouse serviced by many such trucks, batteries continuously cycle through stages including: recharging (typically 7 to 8 hours); cool down period (typically another 7 to 8 hours); and use (typically 7 to 8 hours). Therefore a typical warehouse many have 2 or 3 times the number of batteries as the number of industrial vehicles. Because is takes some time to replace these relatively large batteries, during which time the truck is out of service, an objective in this industry is to operate the truck as long as possible on a battery charge. To do this, however, one must accurately know the state-of-charge or present capacity of the battery.

It also is desirable to know when a particular battery is approaching the end of its useful life at which time it may no longer be recharged to a level sufficient for a reasonably long working period. Nevertheless it is undesirable from an economic perspective to take a battery out of service before absolutely necessary. In order to determine when a particular battery is approaching the end of its useful life operational data has to be gathered over days or weeks to be able to detect a performance degradation trend.

In addition, a need exists to be able to detect several operating conditions that indicate a need to perform maintenance or repairs on a battery. For example, repeated disconnection and connection of the battery to a truck and recharging equipment cause wear of the battery cable. That wear often results in power losses in the cable and thus inefficient battery use. Electric current leakage also can occur between the battery and the frame of the lift truck which may be disadvantageous.

Therefore, a need exists for a system and method that monitors performance of each battery for a fleet of lift trucks.

SUMMARY OF THE INVENTION

A business has a fleet of industrial vehicles each powered by a rechargeable battery. When recharging is required, the battery is removed from a vehicle and replaced by another fully charged battery.

The removable battery serves as ballast to counterbalance loads that are being carried by the industrial vehicle. It is incumbent on the user of the industrial vehicle to ensure that an appropriate battery is used. Accordingly, specifications are provided for the necessary characteristics for the removable battery, including the minimum battery weight. As an assist, to the user to ensure an appropriate battery is used, the operation of the industrial vehicle is controlled in response to the actual weight of the battery that is installed. The present control method reads a battery weight value from an electronic memory attached to the installed battery, and compares that battery weight value to a minimum battery weight specified for the industrial vehicle. When the battery weight value is less than the minimum battery weight, operation of the industrial vehicle is limited to less than the normal operating characteristics.

For example, the height to which the industrial vehicle is able to raise a load may be limited when the installed battery weighs less that the specified is less than the minimum battery weight. As another example, the maximum speed at which the industrial vehicle is able to travel may be reduces when too light weight a battery is installed.

DETAILED DESCRIPTION OF THE PREFERRED EMBODIMENT

The present invention relates to the operation of an industrial vehicle. Although the invention is being described in the context of a stand-up, counterbalanced lift truck used at a warehouse, the inventive concepts are applicable to other types of industrial vehicles, and their use in a variety of facilities, such as a factories, freight transfer stations, warehouses, and stores, for example.

Figure 1:
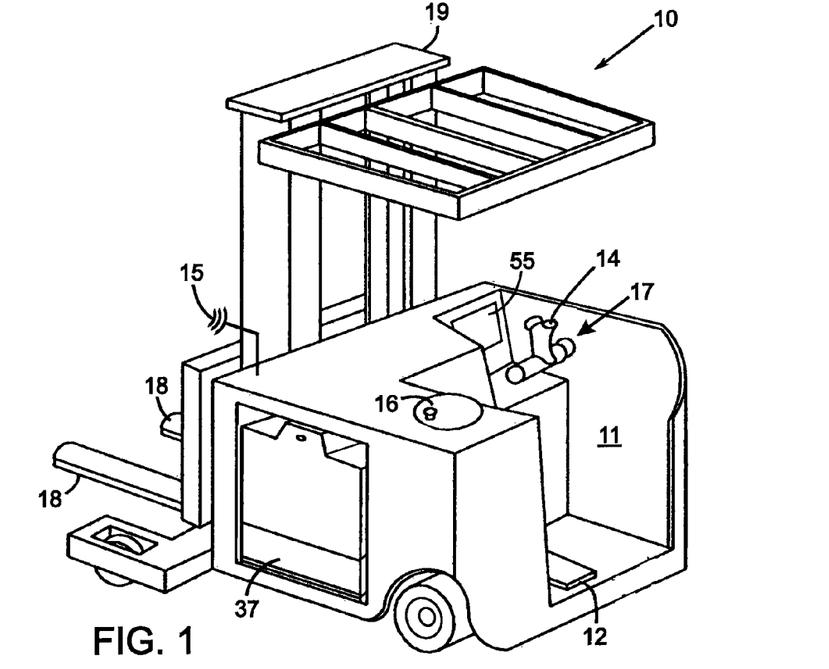
FIG. 1 is a perspective view of an industrial vehicle that utilizes a battery sensor module according to the present invention.

With initial reference to FIG. 1, an industrial vehicle 10, specifically a lift truck, includes an operator compartment 11 with an opening for entry and exit by the operator. Associated with the operator compartment 11 are a control handle 14, a floor switch 12, and steering wheel 16 that collectively serve as operator controls 17. The industrial vehicle 10 has a load carrier 18, such as a pair of forks, that is raised and lowered on a mast 19. As will be described in further detail, a communication system on the industrial vehicle is able to exchange data and commands via an antenna 15 and a wireless signal with an external warehousing system.

Figure 2:
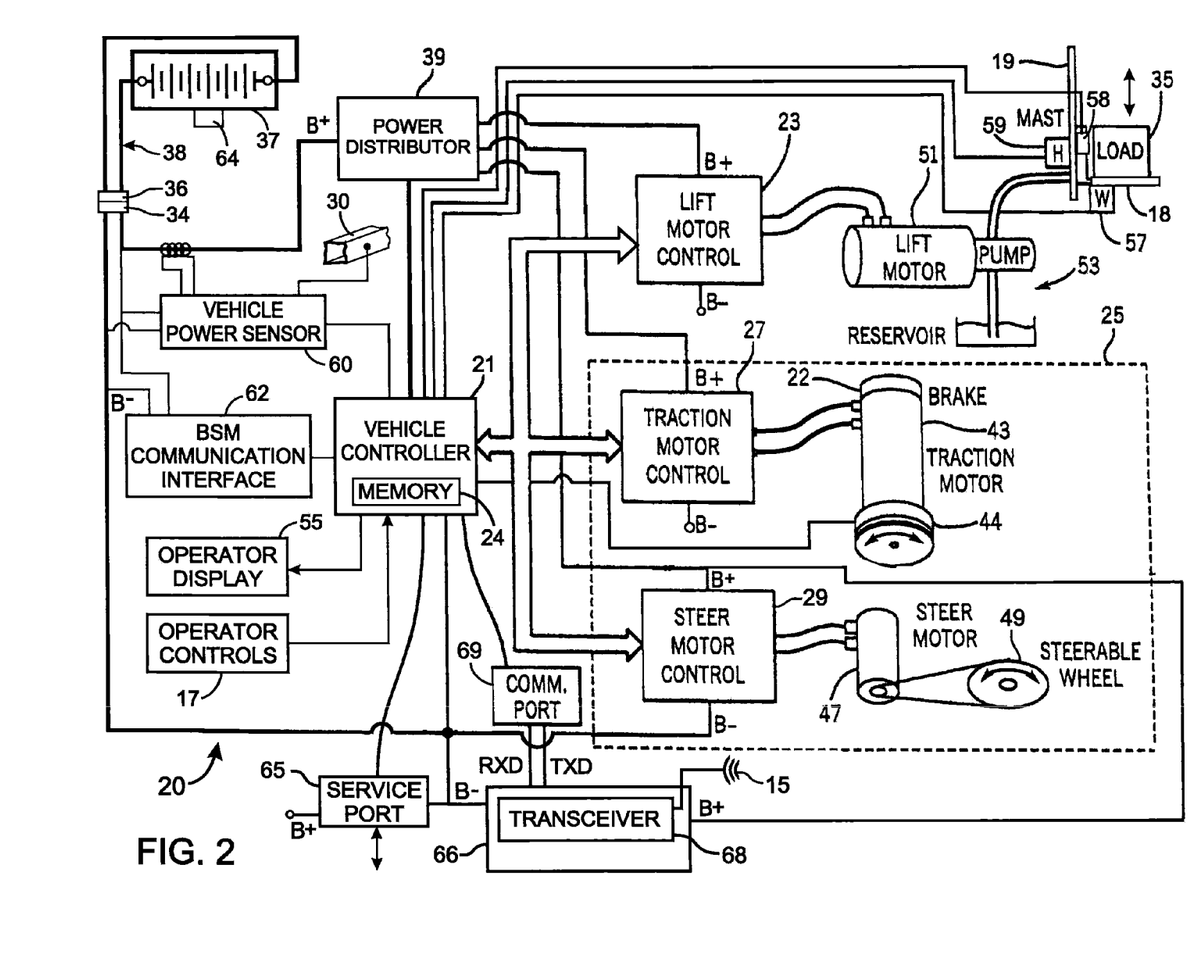
FIG. 2 is a block diagram of a control system of the industrial vehicle.

FIG. 2 is a block diagram of a control system 20 for a typical industrial vehicle 10 that incorporates battery monitoring equipment. The control system 20 comprises a vehicle controller 21 which is a microcomputer based device that includes memory 24, analog to digital converters, and input/output circuits. The input/output circuits receive operator input signals from the operator controls 17 to activate and govern operation of the vehicle functions such as forward and backward travel, steering, braking, and raising and lowering the load carrier 18. In response to the input control signals, the input/output circuits send command signals to each of a lift motor control 23 and a propulsion drive system 25 comprising a traction motor control 27 and a steer motor control 29. The propulsion drive system 25 provides a motive force for moving the industrial vehicle 10 in a selected direction, while the lift motor control 23 drives load carrier 18 along a mast 19 to raise or lower a load 35, such goods being warehoused.

The industrial vehicle 10 is powered by a multiple cell battery 37 that is electrically coupled to the vehicle by a cable 38 that has two conductors. A connector at a first end of the cable 38 is attached to the battery terminals and another connector 36 at the opposite, second end of the cable is connected to a mating connector 34 on the industrial vehicle. The battery 37 furnishes electrical power to the vehicle controller 21, propulsion drive system 25, steer motor control 29, and lift motor control 23 through a bank of fuses or circuit breakers in a power distributor 39.

The traction motor control 27 drives one or more traction motors 43 which is connected to a propulsion wheel to provide motive force to the industrial vehicle. The speed and rotational direction of the traction motor 43 and the associated propulsion wheel are designated by the operator via the operator control handle 14, and are monitored and controlled through feedback derived from a rotation sensor 44. The rotation sensor 44 can be an encoder coupled to the traction motor 43 and the signal therefrom is used to measure the speed and distance that the vehicle travels. The propulsion wheel is also connected to friction brake 22 through the traction motor 43, to provide both a service and parking brake functions for the industrial vehicle 10.

The steer motor control 29 is connected to drive a steer motor 47 and associated steerable wheel 49 in a direction selected by the operator by rotating the steering wheel 16, described above. The direction of rotation of the steerable wheel 49 determines the direction that the industrial vehicle 10 travels.

The lift motor control 23 sends command signals to control a lift motor 51 which is connected to a hydraulic circuit 53 that forms a lift assembly for raising and lowering the load carrier 18 along the mast 19. In some applications, the mast 19 can be a telescoping mast, in which case the hydraulic circuit also raises and lowers the mast. As shown here, a height sensor 59 provides a signal to the vehicle controller 21 indicating the height of the load carrier on the mast 19. Similarly, a weight sensor 57 is provided on the load carrier 18. A load sensor 58, such as a radio frequency identification (RFID) tag reader, is mounted on the mast to obtain an identification of the goods being transported.

In addition to providing control signals to the drive and lift control systems, the vehicle controller 21 furnishes data to an operator display 55 that presents information to the vehicle operator. In addition, the display indicates vehicle operating parameters, such as for example, the speed of travel, battery charge level, hours of operation, time of day, and maintenance needed to be performed. Although not shown here, temperature sensors can also be included to monitor the temperature of the motors and other components. Alert annunciations are presented on the operator display 55 to alert the operator of vehicle conditions requiring attention.

Referring still to FIG. 2, a number of data input and output devices can also be connected to the vehicle controller 21, including, for example, a vehicle power sensor 60 that measure the voltage and electric current received at the industrial vehicle from the battery 37. As will be elaborated upon hereinafter, a battery sensor module (BSM) communication interface 62 exchanges data with a battery sensor module 64 that is mounted on the battery 37. Each battery 37 for the fleet of industrial vehicles has a battery sensor module 64 mounted thereon to gather and store data regarding that particular battery. The industrial vehicle 10 also has a communication port 69, and a maintenance service port 65 by which the vehicle controller 21 communicates with external devices. The communication port 69 is connected to a wireless communication device 66 that includes a transceiver 68 connected to the antenna 15 for exchanging data and commands with a communication system in the warehouse or factory in which the industrial vehicle 10 operates. Any one of several communication protocols such as Wi-Fi, can be used to exchange messages and data via that communication link. Each industrial vehicle 10 has a unique identifier, such as its manufacturer's serial number or a communication network address, that enables messages to be specifically communicated to that vehicle.

The vehicle controller 21 stores data regarding the operation of the industrial vehicle 10. That data can include number of hours in operation, battery state of charge, and fault codes encountered. In addition, load lifting operations are monitored using the time that the lift motor 51 is active. Various speed parameters, such as speed and acceleration of the vehicle and of the mast 19, can also be monitored. The vehicle operational data are collected and stored in a memory 24 in the vehicle controller 21.

Figure 3:
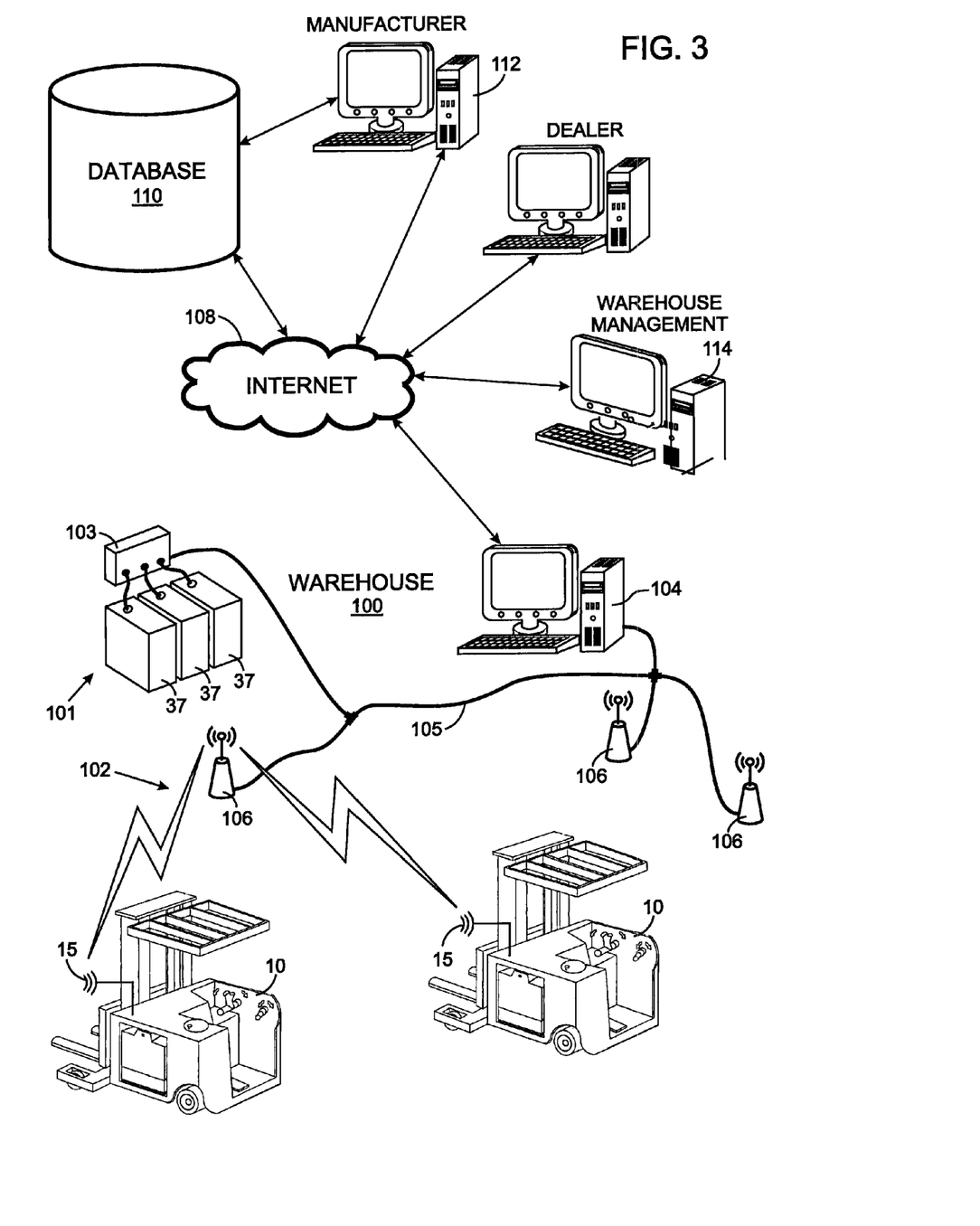
FIG. 3 depicts an exemplary vehicle fleet management system in which a fleets of industrial vehicles communicate via a network with a central computer in a warehouse that is linked to a remote database to which other computers have access.

Referring now to FIG. 3, a warehouse 100, in which one or more industrial vehicles 10 operate, includes a communication system 102 that links the vehicles to a warehouse computer 104. The communication system 102 includes a plurality of wireless access points 106 distributed throughout the warehouse 100, such as in the shipping dock and goods storage areas. The wireless access points 106 are wireless transceivers that are connected via a conventional local area network 105 or a TCP/IP communications link to the warehouse computer 104. Alternatively the wireless access points 106 can be wirelessly coupled, such as through a Wi-Fi link, to the warehouse computer 104. The warehouse 100 has one or more battery charging stations 101 where the batteries 37 are removed from the industrial vehicles and recharged by equipment 103. The charging equipment 103 also is connected to the local area network 105 for exchanging data with the warehouse computer 104.

The warehouse computer 104 is connected to the Internet 108.

The warehouse computer 104 communicates with a management computer system 114 at the headquarters of the warehouse company via the Internet 108. That connection enables the management computer system 114 to receive data regarding the operation of the fleet of industrial vehicle at all the warehouses in the company. Both warehouse computer 104 and the warehouse management computer system 114 execute software for storing, analyzing and reporting the operating information for the industrial vehicles.

The connection of the warehouse computer 104 to the Internet 108, or other external communication network, enables the warehouse computer to access a database 110 that stores vehicle specific data provided by the manufacturer from a manufacturer computer 112. The data gathered from the industrial vehicles at the warehouses also is uploaded and stored in the database 110. Selected data can also be accessed by, for example, warehouse management personnel or vehicle dealers, who can connect to the database 110 through the Internet 108. The various computers can analyze and compare the data gathered from all the industrial vehicles at a given warehouse, at all facilities of the warehouse company, or all the vehicles made by the manufacturer.

As shown in FIG. 2, every battery 37 for use on an industrial vehicle has a battery sensor module 64 mounted thereto. The battery sensor module 64 may be built into the battery so as to be permanently integrated therewith. Alternatively, the battery sensor module 64 may be removable, in which case it remains attached to a particular battery as long as that battery remains in service at the warehouse 100. The battery sensor module 64 gathers operational data while the battery is powering any one of the industrial vehicles 10 and while the battery is being recharged at the charging station 101.

Figure 4:
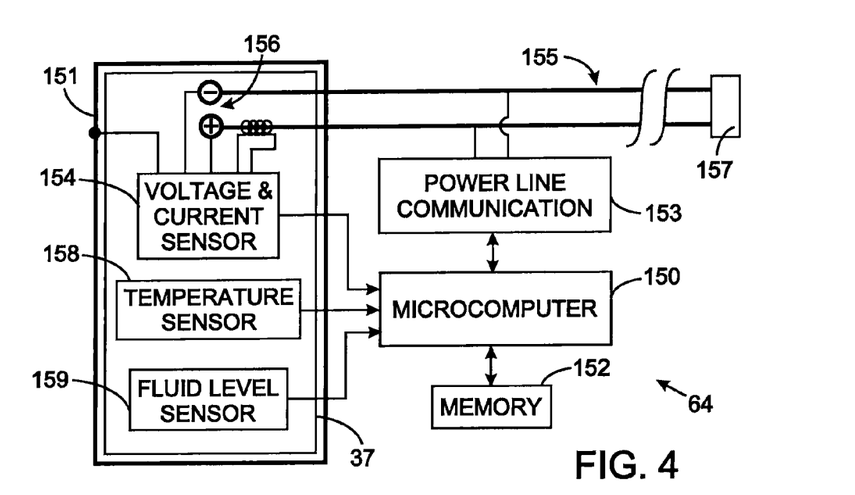
FIG. 4 is a block diagram of the battery sensor module that is mounted on a battery.

With reference to FIG. 4, the battery sensor module (BSM) 64 comprises a microcomputer 150 that includes a digital processor input/output circuits and analog to digital converters. The microcomputer 150 is connected to a memory 152 that stores a software program which is executed by the microcomputer to govern the operation of the battery sensor module 64. In addition, data which is used or produced by that program are stored with the memory 152, as will be described.

Figures 5, 6, 7, 8:
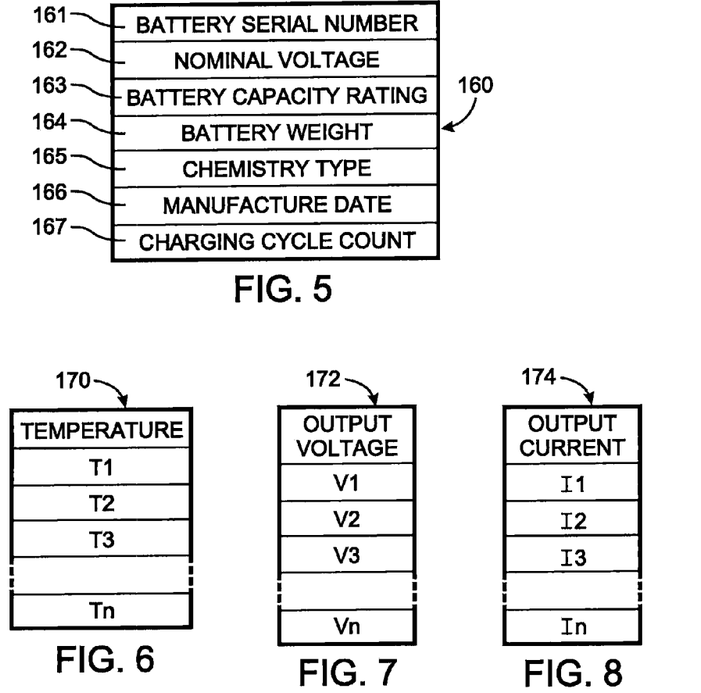
FIGS. 5 through 9 depict tables of different types of data stored in a memory of the battery sensor module.

A memory 152 contains a table with manufacturer specification data related to the battery 37 as depicted in FIG. 5. That specification data table 160 contains a first field 161 in which a unique serial number is stored which identifies and distinguishes that associated battery 37 from all the other batteries in the warehouse 100. A second field 162 stores a value denoting the battery's nominal voltage. The data in a third field 163 indicates the rated capacity of the battery as specified by its manufacturer. Battery capacity is a measure of the charge stored by the battery and represents the maximum amount of energy that can be extracted from the battery under certain stated conditions. The actual energy storage capability of a battery, however, can vary significantly from the rated capacity, because the actual battery capacity depends strongly on the age and past history of the battery, e.g., the charging or discharging regimes and the temperature to which the battery has been exposed. Battery capacity is commonly denoted in terms of ampere hours (Ah) or kilowatt-hours (kWh). Ampere hours is defined as the number of hours for which a battery can provide an electric current equal to the discharge rate at the nominal voltage of the battery. For example, a 400 Ah battery can deliver 40 amperes of current for 10 hours or 20 amperes of current for 20 hours. The kilowatt-hour capacity is approximated by multiplying the ampere hour capacity by the nominal battery voltage. Thus a 24 volt, 400 Ah battery has a 9.6 kWh capacity. Depending upon the particular industrial vehicle, the battery can have a nominal voltage of 24, 36 or 48 volts and typical capacities of 4-32 kWh for a 24 volt battery, 16 to 54 kWh for a 36 volt battery, and 22 to 43 kWh for a 48 volt battery.

The data in a fourth field 164 indicates the battery's weight. A fifth field 165 stores an identification of the chemistry type of the battery and the sixth field 166 stores the date on which the battery was manufactured. Alternatively the sixth field 166 could contain an indication of the date on which the battery was first put into service in the warehouse 100. A seventh field 167 is provided to store a count of the number of times that the battery has been recharged, referred to as the charging cycle count. This count is incremented by the microcomputer 150 in battery sensor module 64 each time the battery is recharged.

Returning to FIG. 4, the battery sensor module 64 has several sensors located on the battery 37. A voltage and current sensor 154 measures the voltage and electric current at the terminals 156 of the battery to which a first end of the battery cable 38 connects. The voltage and current sensor 154 detects a level of electric current flowing in either direction at those terminals and thus the current used to power an industrial vehicle as well as the current that recharges the battery. Alternatively, the voltage may be detected in each of the individual cells of the battery 37. A temperature sensor 158 detects the temperature of the battery 37 and a fluid level sensor 159 detects the battery's electrolyte level.

Periodically, the microcomputer 150 in the BSM reads the signals produced by the battery sensors 154, 158 and 159 and stores the measurement data in other data tables within memory 152. Specifically, FIG. 6 depicts a temperature table 170 in the BSM memory 152 that stores a plurality of measurements from (T1) through (Tn). Similarly, FIGS. 7 and 8 represent data tables 172 and 174 for the output voltage (V) and output current (I), respectively. Another data table 176, depicted in FIG. 9, stores data indicating the condition of the battery at different points in time, such as each time that recharging occurs. As will be described, this data designate by the symbol X may be any of several parameters, such as battery capacity, state of charge or battery resistance, for example.

The BSM 64 has a power line communication circuit 153 that enables the microcomputer 150 to exchange messages bidirectionally with the vehicle controller 21, when the battery 37 is attached to the industrial vehicle. At other times, when the battery is at the charging station 101, the power line communication circuit 153 communicates with the controller of the charging equipment 103. The power line communication circuit 153 is a well known device for sending digital communication signals over a power line, in this instance the battery cable 38. When the microcomputer 150 has data to send to the industrial vehicle 10 or to the charging equipment 103, that data modulates an oscillating carrier signal produced in the power line communication circuit 153. The modulated carrier signal then is sent through the battery cable 38. In another technique, the digital data are transmitted serially as pulses of a high frequency signal. The serial number of the battery is transmitted along with the data in order for the recipient device to identify which battery is associated with the data.

With reference to FIG. 2, the control system 20 for the industrial vehicle 10 has a BSM communication interface 62 electrically attached to a connector 34 that mates with the connector 36 of the battery cable 38. The BSM communication interface 62 receives the information sent through the battery cable 38 by power line communication circuit 153. The BSM communication interface 62 also is able to transmit data and operating commands through the battery cable 38 to the power line communication circuit 153 in the BSM 64 using the same power line communication protocol.

Periodically or when specifically queried, the battery sensor module 64 sends the acquired battery data and its serial number to the BSM communication interface 62 on the industrial vehicle 10. That battery information is forwarded via the communication port 69 to wireless communication device 66 and then onward through the local area network 105 to the warehouse computer 104. In this manner, the warehouse computer stores the performance for all the batteries 37 that are available for use on the industrial vehicles 10 at that facility. The warehouse computer 104 also can forward the battery data to the database 110 and other computer systems, such as computers 112 and 114 for example.

When the battery 37 is connected to the charging equipment 103 in the warehouse 100 as shown in FIG. 3, a similar BSM communication interface 62 within that equipment enables bidirectional communication with each battery sensor module 64 using that same power line communication protocol. This enables the charging equipment 103 to monitor the parameters, such as temperature, electrolyte fluid level and battery current and voltage, that are measured by the sensors in the BSM 64. The charging equipment 103 also is able to send the acquired battery data to the warehouse computer 104.

Battery Allocation Method

The electrical parameters of the battery 37 that are measured by the BSM 64 and by the battery charging equipment 103 are used to calculate the battery capacity, state of charge and internal resistance, which provide an indication of the present condition of the associated battery. When a battery ages or is not maintained properly, the lead plates become "sulfated." Deposits of lead sulfate form on the plates which effectively reduces the active area of each plate. This action reduces battery capacity and increases internal resistance. The calculation of one or more of the actual battery capacity, state of charge or battery resistance is performed by at least one of the microcomputer 150 within the BSM, the vehicle controller 21, a controller within the battery charging equipment 103, or the central warehouse computer 104.

Figure 9:
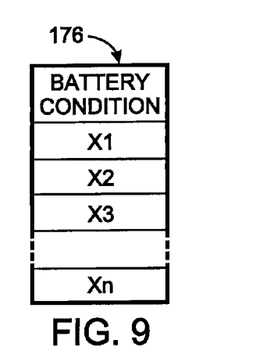

The capacity of a battery is defined as the electric current load divided by the charge or discharge rate. Any of several well known techniques can be employed to derive the present, or actual, capacity of a given battery. That calculation is performed by the battery sensor module 64, each time the associated battery is recharged, and the calculated value then is stored in data table 176 in the BSM memory 152. The present battery capacity derived at the end of recharging may be used as a direct indication of battery aging or can be compared to the battery capacity rating stored in field 163 within the BSM memory 152 to determine the degree of aging. The battery capacity rating represents the capacity of the battery when newly manufactured. A significant decrease (e.g. 20%) in the actual battery capacity from the specified rating indicates that the battery has reached the end of its useful and thus when the battery should be taken out of service.

Alternatively the present condition of the battery 37 can be indicated by the state of charge at the end of recharging or the present internal resistance. These parameters can be determined utilizing any one of several well-know techniques, such as the one described in U.S. Pat. No. 6,556,020, the description of which is incorporated herein by reference. Thus each time a particular battery is recharged one or both of these parameters is calculated by the battery sensor module 64 and then stored in data table 176 in the BSM memory 152. Thus any one of several parameters can be employed to indicate the present condition of a battery and the degree of deterioration of the operational ability of the battery.

The present battery condition, such as the actual battery capacity upon recharging, also is employed to determine with which of the plurality of industrial vehicles 10 within a warehouse a particular battery 37 can be used. In a typical warehouse, certain industrial vehicles are assigned to more strenuous tasks or are used for a greater amount of time during each work shift than other industrial vehicles at that facility. For example, an industrial vehicle 10 at a loading dock may be used almost continuously to load and unload delivery trucks. In contrast, another industrial vehicle may be assigned to a warehouse location in which it is only occasionally used to transport items. Thus, this latter vehicle is used a lesser amount of time during each work shift and does not require a battery that has as great an actual capacity as the battery for a vehicle at the loading dock. Certain industrial vehicles 10 perform more strenuous load handling tasks and thus require a battery with a greater capacity. For example, certain vehicles may be assigned the task of placing goods onto to warehouse shelves which involves lifting heavy loads. In contrast other industrial vehicles may only work at transferring goods from the shelves to the loading dock wherein lowering the goods takes advantage of gravity and is less strenuous that raising the goods onto the shelves. The environment in which an industrial vehicle is used also affects the performance demands placed on its battery and thus whether a lesser capacity battery can be used. For example, an industrial vehicle that works in an extremely cold environment, such as within a freezer area of a warehouse, requires a battery with more actual capacity than a vehicle that is utilized in warmer areas.

As a consequence, a battery that is aging and can no longer be charged to its full rated capacity may not be satisfactory for use in certain industrial vehicles, but will still provide adequate service in vehicles used less strenuously. Even though a particular battery has aged to the point where it can no longer be charged to its full rated capacity, that battery still can be used in certain industrial vehicles and thereby prolonging the useful life of that battery before it has to be taken out of service completely.

To prolong the usefulness of each battery, every industrial vehicle 10 within the warehouse is assigned one of several work ratings indicating the relative intensity of its use during each work shift and the relative performance demands that are placed on its battery. Industrial vehicles with a more intense work rating will receive batteries that have been charged to substantially their full capacity rating. In contrast, industrial vehicles with less intensity work ratings typically receive batteries that are charged only to a fraction of their full capacity rating. Thus, upon being recharged, the present, or actual condition of the battery is determined, either in terms of the actual capacity or internal resistance, for example, as noted previously, and that present condition is used to categorize the battery for use with industrial vehicles particular work ratings. As an example, batteries that presently can be charged between 90% and 100% of their capacity rating are assigned for use in industrial vehicles with the highest intensity rating, whereas batteries with a present charge less that 90% of their capacity rating are assigned for use in industrial vehicles with a lower intensity rating. More that two levels of vehicle intensity ratings and more than two battery capacity categories can be employed.

The association between various capacity batteries and the appropriate industrial vehicles can be accomplished by a color coding scheme, for example, in which the work intensity level of each industrial vehicle is indicated by a colored label and the appropriate batteries for that vehicle based on their present actual capacity are indicated by a similar colored label. Obviously, a battery with a colored label indicating a greater capacity than is required by a particular industrial vehicle can be utilized on that vehicle.

In addition, the present battery condition can be calculated by the battery sensor module 64 or the vehicle controller 21 periodically during use on an industrial vehicle. When that condition falls below predefined threshold, the vehicle operator is notified that the battery capacity is diminishing to a point where recharging soon will be required. At such times, the operation of the industrial vehicle may be restricted to prolong the operational period so that recharging will not have to occur until the end of a work shift. Because some time is required to replace these very heavy batteries, such reduction in vehicle performance minimizes the down time and prolongs the useful work time.

The difference between the battery capacity rating for a new battery and the actual battery capacity also is employed to estimate when a particular battery will have to be taken out of service. This capability allows supervisory personnel at a warehouse to order replacement batteries before they are actually needed.

Battery Weight Verification

With reference again to FIG. 1, the weight of the battery 37 in a lift type industrial vehicle 10 is important to providing ballast to counterbalance the weight of the load 35 that is being transported on the load carrier 18. Such ballast gives the vehicle stability especially when the load is raised high on the mast 19. The manufacturer specification for a particular industrial vehicle includes a minimum battery weight that is required for proper counterbalance.

Although physically possible, it is improper to install a battery that is less than the specified minimum battery weight. Therefore, whenever a battery is replaced on an industrial vehicle, the vehicle controller 21 executes a battery weight verification software routine 180 depicted in FIG. 10. That routine commences at step 181 with the vehicle controller 21 in FIG. 2 sending an inquiry via the BSM communication interface 62 to the BSM 64 on the battery 37, requesting the specification data that is stored in data table 160 within the memory 152. The BSM 64 responds to that inquiry by transmitting the specification data through the battery cable 38 from which it is received by the BSM communication interface 62 and forwarded to the vehicle controller 21.

Figure 10:
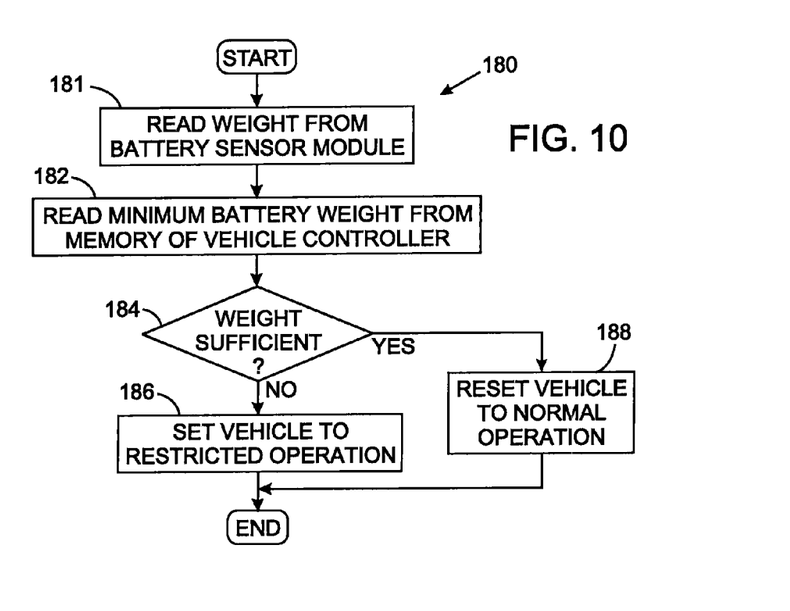
FIG. 10 is a flowchart of a method for restricting operation of the industrial vehicle when an installed battery has insufficient weight to properly counterbalance a load being carried.

The vehicle controller memory 24 also stores the minimum weight specified for the battery in this vehicle, which is read by the vehicle controller 21, at step 182. At step 184, the actual battery weight is compared to the minimum battery weight to determine whether the presently installed battery is heavy enough to counterbalance the vehicle. If the presently installed battery 37 is not heavy enough, the program execution branches to step 186 at which the industrial vehicle 10 is configured for restricted operation. This may be accomplished by setting a flag within the vehicle controller 21. As long as that flag remains set, the vehicle controller 21 limits the operation of the vehicle. For example, the height to which a load 35 is raised on the mast 19 may be restricted so that the loads can not be raised to a height which could create an instability condition. In addition or alternatively, the weight of the loads 35 that may be transported can be limited. As noted previously, a weight sensor 57 measures the weight of the load 35 being on the load carrier 18 and provides an indication of that weight to the vehicle controller 21. Therefore, an attempt to lift an excessively heavy load 35, in this restricted operating mode, causes the vehicle controller to disable the lift motor control 23 thereby preventing that load from being raised. Another operational restriction, when the installed battery has insufficient weight, involves the vehicle controller 21 limiting the maximum speed at which the traction motor 43 propels the industrial vehicle 10. In this situation, the vehicle controller 21 may permit a heavy load 35 to be lifted a small amount off the floor, but then limit the vehicle traction speed. The maximum traction speed that now is permitted is significantly less than the maximum speed permitted when a properly sized battery is installed. Other types of operational restrictions may be implemented when a battery of insufficient weight is installed.

During the periods when vehicle operation is limited, the vehicle controller 21 provides an indication of the load restriction mode to the operator via the operator display 55. Other types of visual and audible annunciations can be issued.

Battery Cable Testing

Because the batteries 37 are frequently removed from one industrial vehicle 10, attached to and detached from the charging equipment 130, and reinstalled on another vehicle, the battery cable is subjected to wear. With reference to FIG. 2, in addition to receiving voltage and electric current data from the BSM 64 on a battery 37, the vehicle controller 21 occasionally receives data from the vehicle power sensor 60. This latter data indicate the electric current and voltage received from the battery 37 at the connector 34 on the industrial vehicle 10. This provides a measurement of the voltage and electric current at the second, or vehicle, end of the battery cable 38. Thus, the vehicle controller 21 receives data regarding the voltage and electric current at both ends of the battery cable 38.

By comparing that data from opposite ends of the battery cable 38, the vehicle controller 21 determines whether a substantial voltage drop occurs in that cable and thereby whether the cable has deteriorated to a degree where replacement is required. The voltage drop in that cable is directly related to the resistance in the cable to the flow of electric current between the battery and the industrial vehicle 10. A similar comparison of the voltage at opposite ends of the battery cable 38 occurs when the battery 37 is connected to the equipment 103 at the charging station 101. If the voltage drop across the cable exceeds a predefined threshold, an alert is given to either the operator of the vehicle via the operator display 55 or to personnel at the charging station 101. Other forms of visual and audible annunciations can be issued.

The level of electric current at both ends of the battery cable 38 can also be compared to detect current leakage to the frame or other components of the industrial vehicle as may occur if the insulation of the battery cable has cracks. Here too, a difference in the electric current levels measured at both ends of the battery cable 38 exceeding a predefined threshold causes an alert to be given to the vehicle operator or personnel at the battery charging station 101.

Therefore, the present system provides a mechanism for automatically checking the integrity of the battery cable 38 and providing an alert when significant deterioration has occurred.

Battery Current Leakage

Referring to FIGS. 2 and 4, a circumstance encountered on these industrial vehicles is electric current leakage from the battery 37 to the metal case 151 that houses the battery. This leakage may occur due to a number of conditions such as unevaporated electrolyte spilled on the cell tops or internal sulfation build-up at the bottom of the cell. Typically, the frame 30 of the industrial vehicle 10 is not connected to the negative terminal of the battery 37 because of this leakage possibility. It is important that operating personnel become aware of this electric current leakage in order that corrective measures can be taken.

For that purpose, the voltage and current sensor 154 in the battery sensor module 64 includes an input that is connected to the metal battery case 151. Thus, in addition to detecting the voltage across the output terminals 156 of the battery, the voltage and current sensor 154 periodically measures the resistance between the battery case 151 and each of the positive and negative output terminals 156. If the resistance level with respect to the battery case 151 and either of these terminals is below a predefined level, an alert message is sent by the BSM 64 to the vehicle controller 21. The vehicle controller 21 responds to that alert message by providing an alert indication on the operator display 55 or by another visual or audible annunciation.

An additional or alternative test can be performed by sensing the level of any electric current flow through the voltage and current sensor 154 between the input connected to the battery case 151 and the inputs coupled to the battery terminals 156. If such electric current exceeds a predefined threshold level, e.g., 1.0 mA, an alert message is sent to the vehicle controller 21 or the charging equipment 103, which issues an alert to the operator.

With particular reference to FIG. 2, to detect electric current leakage elsewhere on the industrial vehicle 10, the vehicle power sensor 60 has an input connected to the frame 30 of the industrial vehicle. This enables the vehicle power sensor to detect the level of resistance between the vehicle frame and the B+ and B− conductors of the electrical system. A low resistance indicates a short circuit or current leakage in other components of the vehicle, such as the motors, control circuits or cabling. When such an abnormal condition is found, an appropriate alert is given via the operator display 55. If an alphanumeric type operator display 55 is used, that alert indicates the nature of the condition, such as current leakage detected by the battery sensor module or by the vehicle power sensor which thus indicates the approximate location and nature of the abnormal condition.

Other Operating Conditions

The various items of operational data received by the vehicle controller 21 from the BSM 64 can be used to detect other abnormal conditions of the battery. When such conditions are found, an appropriate alert is provided to the operator of the vehicle 10 via the operator display 55 or to personnel at the charging station 101 via a similar display on the charging equipment 103. For example, the temperature data sent from the BSM 64 can indicate that the battery is overheating or has been subjected to freezing temperatures. Similarly, the data produced by the fluid level sensor 159 can be utilized to alert the appropriate personnel that the electrolyte level in the associated battery 37 is abnormally low and additional water needs to be added to the battery.

As noted previously, all the gathered data from the battery sensor module, other sensors on board the vehicle, and the charging equipment 103 can be transmitted to the central warehouse computer 104 for storage and analysis. The central warehouse computer 104 can also relay that battery related data via the internet to the central database 110 or to other computers, such as those for the vehicle manufacturer, a local dealer, or the warehouse company management.

The foregoing description was primarily directed to a certain embodiments of the industrial vehicle. Although some attention was given to various alternatives, it is anticipated that one skilled in the art will likely realize additional alternatives that are now apparent from the disclosure of these embodiments. Accordingly, the scope of the coverage should be determined from the following claims and not limited by the above disclosure.

The invention claimed is:

1. A method for controlling an industrial vehicle that has normal operating characteristics, said method comprising:
reading a battery weight value from an electronic memory attached to a battery;
a vehicle controller device comparing the battery weight value to a specified battery weight value specified by a manufacturer of the industrial vehicle for counterbalancing the industrial vehicle; and
limiting operation of the industrial vehicle to less than the normal operating characteristics when the battery weight value is less than the specified battery weight value.

2. The method as recited in claim 1 wherein limiting operation of the industrial vehicle comprising limiting a height to which the industrial vehicle is able to raise a load.

3. The method as recited in claim 1 wherein limiting operation of the industrial vehicle comprising limiting loads carried by the industrial vehicle to less than a predefined weight.

4. The method as recited in claim 1 wherein limiting operation of the industrial vehicle comprising limiting a speed at which the industrial vehicle is able to travel.

5. The method as recited in claim 1 wherein limiting operation of the industrial vehicle comprising inhibiting the industrial vehicle from carrying a load.

6. The method as recited in claim 1 wherein reading a battery weight value comprises transmitting the battery weight value through a wire that supplies electrical power from the battery to operate a motor on the industrial vehicle.

7. A method for controlling an industrial vehicle that has normal operating characteristics, said method comprising:
reading a battery weight value from an electronic memory attached to a housing that contains a battery;
transmitting the battery weight value from the battery to a controller device on the industrial vehicle;
the controller device comparing the battery weight value to a specified battery weight value specified by a manufacturer of the industrial vehicle for counterbalancing the industrial vehicle; and
limiting operation of the industrial vehicle to less than the normal operating characteristics when comparison of the battery weight value to a specified battery weight value indicates that the battery weighs less that is desired for the industrial vehicle.

8. The method as recited in claim 7 wherein limiting operation of the industrial vehicle comprising limiting a height to which the industrial vehicle is able to raise a load.

9. The method as recited in claim 7 wherein limiting operation of the industrial vehicle comprising limiting loads carried by the industrial vehicle to less than a predefined weight.

10. The method as recited in claim 7 wherein limiting operation of the industrial vehicle comprising limiting a speed at which the industrial vehicle is able to travel.

11. The method as recited in claim 7 wherein limiting operation of the industrial vehicle comprising inhibiting the industrial vehicle from carrying a load.

12. The method as recited in claim 7 wherein transmitting the battery weight value comprises transmitting the battery weight value through a wire that supplies electrical power from the battery to operate a motor on the industrial vehicle.

13. The method as recited in claim 7 further comprising:
detecting leakage of electric current from the battery to the housing; and
issuing an alert annunciation upon detecting the leakage of electric current greater than a predefined level.

14. The method as recited in claim 13 further comprising limiting operation of the industrial vehicle upon detecting the leakage of electric current greater than a predetermined level.

15. The method as recited in claim 7 further comprising attaching the electronic memory to the housing in a manner wherein the electronic memory remains so attached upon the housing and the battery being removed from the industrial vehicle.

* * * * *